United States Patent Office 3,544,267
Patented Dec. 1, 1970

3,544,267
CALCIUM HYPOCHLORITE PRODUCT AND
PROCESS FOR PRODUCING SAME
George Roman Dychdala, Norristown, Pa., assignor to
Pennwalt Corporation, a corporation of Pennsylvania
No Drawing. Filed Sept. 4, 1968, Ser. No. 757,449
Int. Cl. C01b *11/06*
U.S. Cl. 23—86                                4 Claims

ABSTRACT OF THE DISCLOSURE

Water is uniformly mixed with substantially dry particulate calcium hypochlorite prone to self-propagating decomposition to provide a free-flowing, essentially dust-free, decomposition-resistant calcium hypochlorite composition having a granular configuration and a water content of from about 4 to about 15 percent by weight.

This invention concerns an improved calcium hypochlorite composition and the method of producing same. More particularly, this invention involves a free flowing, essentially dust-free, highly stable, decomposition-resistant calcium hypochlorite composition having a granular configuration with a particle size distribution within the range of about 0.075 mm. to about 2 mm. and a water content of from about 4 to about 15 percent by weight. The composition is prepared by a process which comprises uniformly mixing water with substantially dry (that is, containing 1% by weight or less of water) particulate calcium hypochlorite to raise the water content thereof to the aforesaid levels.

Several processes are presently used for the production of calcium hypochlorite on a commercial scale. In one process, lime in aqueous slurry, or a mixture of lime and dibasic calcium hypochlorite [Ca(OCl)$_2$· Ca(OH)$_2$], is chlorinated to produce a solution of calcium hypochlorite. The liquor is clarified to remove the lime impurities and then treated with an alkali metal salt to salt out (precipitate) crystals of neutral calcium hypochlorite dihydrate [Ca(OCl)$_2$·2H$_2$O]. In another process, a slurry of hydrated lime and caustic soda is chlorinated and cooled to −10° F. whereupon 80% of the available chlorine content comes down in the form of a triple salt,

Ca(OCl)$_2$·NaOCl·NaCl·12H$_2$O which is separated from the mother liquor and added to a chlorinated lime slurry in such proportion that the calcium chloride in the chlorinated lime equals the sodium hypochlorite content of the triple salt crystals on a mole basis. The mixture is warmed to precipitate crystals of neutral calcium hypochlorite dihydrate. In another process, crystals of dibasic calcium hypochlorite in aqueous suspension are chlorinated to obtain a slurry of neutral calcium hypochlorite dihydrate in a mother liquor of reduced calcium chloride content. In yet another process, heavy lime slurry is chlorinated at 40–45° C., separating large crystals of hemibasic calcium hypochlorite

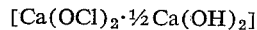
[Ca(OCl)$_2$·½Ca(OH)$_2$]

The hemibasic crystals are suspended in a thin chlorinated lime slurry and chlorinated, resulting in the formation of a slurry of laminar crystals of neutral calcium hypochlorite dihydrate.

In the product recovery step of all of the foregoing processes and modifications and variations thereof, crystals of the neutral calcium hypochlorite dihydrate are separated from the aqueous mother liquors by filtration or centrifugation. The wet cake, containing on the order of from about 30 to about 40 percent by weight of water, is dried in air driers at from about 180° F. to 200° F. to produce neutral, substantially anhydrous calcium hypochlorite product [Ca(OCl)$_2$] which contains less than 1% by weight of water.

In a somewhat dissimilar process, a moist gaseous mixture of carbon dioxide and air containing about 10% chlorine is passed through a rotating tube against a flow of soda ash, part of which is converted to bicarbonate. The exit gas formed from the reaction, containing a few percent chlorine monoxide, is passed through cold water to form a solution of hypochlorous acid. This aqueous solution is carefully neutralized with hydrated lime and spray-dried to yield an intermediate calcium hypochlorite product which is densified and dried to a water content of below 1%. Chemically, the above-described commercial calcium hypochlorite products are about 70 to 74 percent by weight of Ca(OCl)$_2$, the remainder being sodium chloride, calcium chloride, calcium hydroxide, calcium carbonate and calcium chlorate. However, the products are always nominally referred to in the trade as calcium hypochlorite.

Calcium hypochlorite is primarily used for water treatment, especially of swimming pools where it serves as a convenient source of chlorine for disinfectant purposes, and for general sanitation. It is normally shipped in 1- and 2-lb. bottles, packages of 3.75, 8 and 35 pounds and 100-pound drums. The above described commercial products, i.e. having a water content of less than about 1%, are largely comprised of granules. However, there is present in these products a significant amount, e.g., from about 0.1 to about 2%, of undesired dusty fines having a particle size range such that they pass through a 200 mesh screen (Tyler Screen Scale) and usually through a 325 mesh screen.

The stability of the foregoing commercially available calcium hypochlorite products and similar products known heretofore is usually inversely proportional to the water content, generally under about 1%, which, for the purpose of this specification, is considered to be substantially dry calcium hypochlorite. Said commercial products normally lose from 1 to about 4% of their available chlorine content per year in storage. The above products, moreover, have several major disadvantages of which the composition of the present invention is unexpectedly devoid. One disadvantage of the above products is, as previously mentioned, the presence of extremely small dusty particles of calcium hypochlorite that are easily air-borne and account for some lost production during manufacture and packaging and, in addition, create a nuisance and dangerous irritant to the plant worker and ultimate consumer.

Other major disadvantages of the prior known commerical calcium hypochlorite preparations relate to their instability and readiness to undergo exothermic decomposition regardless of temperature. If any portion of a batch of said calcium hypochlorite, whether in a small container, large drum or uncontained mass, reaches a temperature of about 350° F., it will undergo a selfsustaining and self-propagating decomposition which will spread through the entire batch until decomposition is complete. The decomposition may be initiated by the accidental touching of a live flame or spark to the calcium hypochlorite, as for example, the accidental contact of a lit match or cigarette thereto. Decomposition may also be initiated by contacting the hypochlorite with just a single drop of organic material, for example, glycerine, an alcohol, a variety of hydrocarbons such as petroleum oil and many other. The decomposition evolves gaseous chlorine which constitutes a toxic hazard to personnel in the area, and also evolves oxygen which intensifies a fire that might reach stored quantities of calcium hypochlorite.

In accordance with the present invention, a measured amount of water is uniformly added to the substantially dry, dusty, fines-laden, particulate calcium hypochlorite products prepared as described above so as to provide a water content therein of from about 4 to about 15 percent by weight; the preferred water content is from about 7 to 12 percent. The calcium hypochlorite composition thereby produced is a granular, free-flowing, easily handled, stable, decomposition-resistant material devoid of dusty fines and having a particle size distribution in the range of about 0.075 to about 2 mm. The novel granular composition of this invention has a yellowish cast in contrast to the white color of the substantially dry starting material.

There are various techniques available for uniformly mixing water with the substantially dry calcium hypochlorite product to raise its water content to the prescribed level and obtain the granular composition of this invention. Some of these techniques are described hereinbelow; modifications and variations of these will be readily apparent to those having ordinary skill in materials handling procedures. For example, the water addition can be carried out in a conventional solids-liquids mixing apparatus such as the Patterson-Kelley Twin Shell Liquids-Solids Blender. When water in the specified amounts is mixed with the substantially dry calcium hypochlorite, there is an exothermic reaction with a resulting rise in temperature of the mass. Accordingly, in the twin-shell blender the hydration temperature may go as high as 150° F. However, the heat of reaction can be controlled by using a jacketed blender with appropriate coolant feed or by using ice as the hydrating medium. Another and preferred method of adding water to the dry, dusty, calcium hypochlorite starting material is as a fine spray or mist while agitating the mass such as in the aforesaid blender or in other appropriate equipment such as a vibrating Sweco screen equipped with water spray or atomizing units, a screw flight conveyor, rotating tray apparatus, or a ribbon blender.

The following examples illustrate the present invention and the unexpected results obtained thereby but are not to be construed as limitative of its scope. The typical starting material is a commercial, particulated, substantially dry calcium hypochlorite composition produced by the chlorination of a mixture of lime and dibasic calcium hypochlorite as described earlier in this specification. This product ("Percloron" calcium hypochlorite manufactured by the Pennsalt Chemicals Corporation), which has a moisture content of about 0.5 to about one percent, is a granular material that is easily abraded to form dusty fines. As an indication of the undesirable reactivity and instability of substantially dry calcium hypochlorite, (1) contacting this dry material (a test sample may consist of about 10 to 500 grams) with a lit match or burning cigarette (the "ignition" test) results in immediate ignition, blinding flame, and total destruction of the mass of material by self-propagation of the decomposition reaction; (2) contacting the dry calcium hypochlorite with a drop of glycerine results in a delayed reaction with fire, fuming, carbonization, and propagation to complete destruction; (3) contacting the dry calcium hypochlorite with a drop of 2-propanol plus ignition with a lit match or cigarette causes immediate reaction with blinding flame, and propagation to total destruction with complete fusion of the mass.

Hydrated calcium hypochlorite compositions are prepared in accordance with this invention by treating portions of the aforedescribed, substantially dry particultae calcium hypochlorite with varying amounts of a fine spray of water while mixing. Specimens are thus prepared having the following water contents in percent by weight; 4%, 5%, 6%, 7%, 8%, 9%, 10%, 11%, 12%, 13%, 14%, 15%. The hydrated compositions are dust-free, free-flowing, granular matterials. The reactivity tests with these compositions show the following results: (1) ignition with a lit match or cigarette causes the reaction of none or only several granules; there is no propagation of reaction; (2) there is no reaction from contact with a drop of glycerine for at least from about 10 to 60 seconds, and then there is merely slight fuming and no propagation of reaction; (3) when the product is contacted with 2-propanol and ignited, there is a very slight flame emission and localized reaction with a trace of crusting and no propagation of reaction. The best test results are noted for the compositions containing at least about 7% water. Samples are also prepared which contain less than 4% water. It is found that these specimens do not provide the good resistance to ignition, reactivity, and propagation shown by the claimed compositions.

The storage stability of the claimed hydrated compositions is outstanding. Large samples of the foregoing preparations containing at least 4% water are stored at ambient temperatures for periods of over two years. The products remain dust-free and free-flowing and there is no material loss of active chlorine therefrom. It is observed, however, that when the water content of the hydrated calcium hypochlorite is greater than 15%, the storage stability characteristics of the composition begin to suffer with regard to loss of active chlorine content.

It is also unexpectedly found that the hydrated products of this invention are advantageously more readily dispersed and solubilized in water than the substantially dry material at the 1% solution concentration level, a concentration normally used in preparing swimming pool treatment feed solutions.

A marked economic advantage resulting from the practice of the method of this invention is the alleviation of the necessity of separating and recycling the dusty fines formed during the manufacture of granular calcium hypochlorite since the present invention provides a method of converting these fines to an unobjectionable and integral part of the described hydrated compositions.

I claim:

1. A free-flowing, dust-free, granular, hydrated calcium hypochlorite composition, which is resistant to exothermic, self-propagating decomposition when contacted by flame, spark or a contaminating organic substance, essentially consisting of at least about 70% by weight $Ca(OCl)_2$ based on dry weight of the composition and having a yellowish cast and a particle size distribution essentially consisting within the range of 0.075 to 2 mm. and a water content of from 4 to 15 percent by weight based on total weight of the composition.

2. The composition according to claim 1 wherein the water content is from about 7 to about 12% by weight.

3. The method of preparing a free-flowing, dust-free, granular, hydrated calcium hypochlorite composition resistant to exothermic, self-propagating decomposition when contacted by flame, spark or a contaminating organic substance, and having a yellowish cast and a particle size distribution essentially consisting within the range of 0.075 to 2 mm. and a water content of from 4 to 15% by weight based on total weight of the composition which comprises uniformly contacting a substantially dry, particulate calcium hypochlorite composition essentially consisting of at least about 70% by weight $Ca(OCl)_2$ with a spray or mist of a measured amount of water while agitating said composition.

4. The method according to claim 3 wherein the water content of the granular product is from about 7 to about 12% by weight.

References Cited

UNITED STATES PATENTS

| | | | |
|---|---|---|---|
| 888,122 | 5/1908 | Schultze | 23—86 |
| 1,510,216 | 9/1924 | Gammal | 23—86 |
| 1,743,242 | 1/1930 | Schultze | 23—86 XR |
| 1,826,629 | 10/1931 | Moore et al. | 23—86 |
| 1,945,913 | 2/1934 | Remele | 23—86 |
| 1,969,236 | 8/1934 | Reitz | 23—86 |
| 2,007,429 | 7/1935 | Klopstock et al. | 23—86 |
| 2,195,756 | 4/1940 | Taylor | 23—86 XR |
| 2,195,757 | 4/1940 | Robson et al. | 23—86 |

EDWARD STERN, Primary Examiner

252—187

U.S. Cl. X.R.

PO-1050
(5/69)

UNITED STATES PATENT OFFICE
CERTIFICATE OF CORRECTION

Patent No. 3,544,267      Dated December 1, 1970

Inventor(s) George Roman Dychdala

It is certified that error appears in the above-identified patent and that said Letters Patent are hereby corrected as shown below:

Column 1, line 37, "$[Ca(OCl)_2 \cdot Ca(OH)_2]$" should read

--$[Ca(OCl)_2 \cdot 2Ca(OH)_2]$--;

Column 4, line 14 "matrerials" should read --materials--.

SIGNED AND
SEALED
MAR 9 1971

(SEAL) 
Attest:

Edward M. Fletcher, Jr.
Attesting Officer

WILLIAM E. SCHUYLER, JR
Commissioner of Patents